(12) United States Patent
Kim

(10) Patent No.: US 7,577,078 B2
(45) Date of Patent: Aug. 18, 2009

(54) MAGNETIC RECORDING MEDIUM AND APPARATUS AND METHOD FOR READING DATA FROM THE MAGNETIC RECORDING MEDIUM USING PARALLEL AND ANTI-PARALLEL MAGNETIZATION DIRECTION IN SEPARATE MAGNETIC LAYERS

(75) Inventor: Sung-dong Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 100 days.

(21) Appl. No.: 10/456,634

(22) Filed: Jun. 9, 2003

(65) Prior Publication Data
US 2004/0114470 A1 Jun. 17, 2004

(30) Foreign Application Priority Data
Dec. 14, 2002 (KR) ............ 10-2002-0080059

(51) Int. Cl.
*G11B 9/00* (2006.01)
(52) U.S. Cl. ............ 369/126; 365/151
(58) Field of Classification Search .......... 360/59; 369/126
See application file for complete search history.

(56) References Cited

U.S. PATENT DOCUMENTS

| | | | | |
|---|---|---|---|---|
| 5,097,443 | A * | 3/1992 | Kaneko et al. | 365/153 |
| 5,138,402 | A | 8/1992 | Tsukamoto et al. | |
| 5,144,581 | A * | 9/1992 | Toda et al. | 369/126 |
| 5,289,402 | A * | 2/1994 | Yamamoto et al. | 365/46 |
| 5,331,589 | A * | 7/1994 | Gambino et al. | 369/126 |
| 5,335,197 | A * | 8/1994 | Kaneko et al. | 365/153 |
| 5,446,684 | A * | 8/1995 | Kaneko et al. | 365/46 |
| 5,481,491 | A * | 1/1996 | Yamamoto et al. | 365/148 |

(Continued)

FOREIGN PATENT DOCUMENTS

CN 1243999 2/2000

(Continued)

OTHER PUBLICATIONS

China Office Action dated Aug. 6, 2007 and English translation.

(Continued)

*Primary Examiner*—Tan X Dinh
(74) *Attorney, Agent, or Firm*—Harness, Dickey & Pierce, P.L.C.

(57) ABSTRACT

A magnetic recording medium and an apparatus and a method for reading data using spin-dependent scattering of electrons are provided. The apparatus includes a probe, a magnetic recording medium, a control unit, and a measurement unit. The probe emits hot electrons through a Schottky junction or tunnel barrier. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer. The control unit applies voltage to the probe so that the probe can emit hot electrons. The measurement unit reads data recorded on the magnetic recording medium by detecting output current at the substrate that varies according to the parallel or anti-parallel alignment of magnetizations of the first and second magnetic layers.

18 Claims, 3 Drawing Sheets

U.S. PATENT DOCUMENTS

| | | | | |
|---|---|---|---|---|
| 5,646,882 | A | * | 7/1997 | Watanuki et al. ............. 365/151 |
| 5,659,537 | A | * | 8/1997 | Hirokane et al. ......... 369/13.08 |
| 5,675,532 | A | * | 10/1997 | Gemma et al. .............. 365/151 |
| 5,723,198 | A | * | 3/1998 | Hosoe et al. ................. 428/141 |
| 5,738,946 | A | * | 4/1998 | Iwasaki et al. ........... 428/811.2 |
| 5,756,202 | A | * | 5/1998 | Van Kesteren et al. ....... 428/332 |
| 5,757,734 | A | * | 5/1998 | Nakajima et al. ........ 369/13.15 |
| 5,909,410 | A | * | 6/1999 | Awano et al. ............ 428/820.1 |
| 5,939,187 | A | * | 8/1999 | Hirokane et al. ........... 369/13.4 |
| 6,101,164 | A | * | 8/2000 | Kado et al. ................. 369/126 |
| 6,111,784 | A | * | 8/2000 | Nishimura .................. 365/173 |
| 6,162,532 | A | | 12/2000 | Black et al. |
| 6,178,112 | B1 | * | 1/2001 | Bessho et al. ............... 365/173 |
| 6,205,092 | B1 | * | 3/2001 | Yamaguchi et al. ...... 369/13.14 |
| 6,304,481 | B1 | | 10/2001 | Hurt |
| 6,438,026 | B2 | * | 8/2002 | Gillies et al. ................ 365/158 |
| 6,477,120 | B1 | * | 11/2002 | Iketani et al. ............ 369/13.38 |
| 6,480,365 | B1 | | 11/2002 | Gill et al. |
| 6,519,211 | B1 | * | 2/2003 | Murakami et al. ....... 369/13.08 |
| 6,654,279 | B2 | * | 11/2003 | Nishimura .................. 365/173 |
| 6,665,258 | B1 | | 12/2003 | Dietzel et al. |
| 6,671,234 | B1 | * | 12/2003 | Hirokane et al. ......... 369/13.43 |
| 6,819,588 | B2 | * | 11/2004 | Baumeister et al. ......... 365/174 |
| 6,906,368 | B2 | * | 6/2005 | Ito et al. ..................... 257/295 |
| 7,042,669 | B2 | * | 5/2006 | Ogawa et al. ................. 360/55 |

FOREIGN PATENT DOCUMENTS

| | | |
|---|---|---|
| CN | 1243999 A | 2/2000 |
| CN | 1249525 A | 4/2000 |
| DE | 10029593 A1 | 1/2001 |
| DE | 10029593 A1 | 1/2001 |
| EP | 0977182 | 2/2000 |
| JP | 01-220328 A | 9/1989 |
| JP | 05-128599 | 5/1993 |
| JP | 06-300515 A | 10/1994 |
| JP | 8-87702 | 4/1996 |
| JP | 10-040676 | 2/1998 |
| JP | 10-208320 | 8/1998 |

OTHER PUBLICATIONS

Official Action issued by the Japanese Patent Office in corresponding Japanese Application No. 2003-416091, Nov. 1, 2006; and English translation thereof.

* cited by examiner

MAGNETIC RECORDING MEDIUM AND APPARATUS AND METHOD FOR READING DATA FROM THE MAGNETIC RECORDING MEDIUM USING PARALLEL AND ANTI-PARALLEL MAGNETIZATION DIRECTION IN SEPARATE MAGNETIC LAYERS

This application claims the priority of Korean Patent Application No. 2002-80059, filed on Dec. 14, 2002, in the Korean Intellectual Property Office, the disclosure of which is incorporated herein in its entirety by reference.

BACKGROUND OF THE INVENTION

1. Field of the Invention

The present invention relates to a magnetic recording medium and an apparatus and a method for reading data from the magnetic recording medium, and more particularly, to a magnetic recording medium and an apparatus and a method for reading data from the magnetic recording medium using spin-dependent scattering of electrons.

2. Description of the Related Art

In general, there are two conventional methods for reading data recorded on a magnetic recording medium. One involves detecting a magnetic field generated from the magnetic recording medium, and the other involves taking advantage of a magneto-optical effect. However, as the density of data recorded on data storage media increases and the size of a bit, the smallest unit of data recorded on the data storage medium, decreases, these two methods become more susceptible to technical problems. For example, in the case of the method of reading data from a magnetic recording medium by detecting a magnetic field generated from the magnetic recording medium, despite aggressive research on reducing the size of a bit, there is still a limit to the size of a magnetic field sensor. In addition, decrease in the size of a bit is accompanied by decrease in the intensity of output signals, and current technology is incapable of amplifying output signals beyond a certain level. In the case of the method of reading data from a magnetic recording medium taking advantage of a magneto-optical effect, the fact that resolution is determined by the wavelength of light used imposes restrictions on recording density that can be applied to a magnetic recording medium.

In order to solve the technical problems of the conventional data reproduction methods, U.S. Pat. No. 6,304,481 discloses an apparatus and a method for storing data using spin-polarized electrons.

FIG. 1 is a cross-sectional view of a data storage device taught by the U.S. Pat. No. 6,304,481 patent. Referring to FIG. 1, the data storage device includes a control unit 1, a spin-polarized electron source 40 having a tip 2b, an extractor 4, collimators 6, 7, and 9, electrostatic lenses 10, 11, and 12, and insulating elements 5 and 8. The data storage device also includes a blanking element 13, coarse and fine microdeflectors 14 and 15, respectively, an electron detector 16, a data storage layer 17, and a substrate 18.

The control unit 1 receives control signals and data from an external device via ports ADDRESS IN, DATA IN, and DATA OUT, interprets the control signals and the data using necessary protocols, and returns control responses and data to the external device.

The electron source 40 provides spin-polarized electrons 3, and then tip 2b collects the spin-polarized electrons 3. The extractor 4 extracts the spin-polarized electrons 3 from the tip 2b, and the collimators 6, 7, and 9 collimate the spin-polarized electrons 3 into a spin-polarized electron beam 19. The electrostatic lenses 10, 11, and 12 focus the spin-polarized electron beam 19, and the microdeflectors 14 and 15 deflect the spin-polarized electron beam 19 toward a magnetic field generated in part of the data storage layer 17 on which data will be stored.

The data storage layer 17 includes a plurality of alignment regions 22 and a conductive element 27 insulated from the data storage layer 17 by the insulating element 28.

The control unit 1 applies a voltage $V_1$ to the electron source 40 and voltages $V_2$ through $V_5$ to the extractor 4 and the collimators 6, 7, and 9, respectively, in order to obtain desired characteristics of the spin-polarized electron beam 19. Voltages $V_6$ through $V_8$ are applied to the electrostatic lenses 10, 11, and 12, respectively, by the control unit 1 to create electrostatic fields through lens apertures. Voltages $V_{12}$ through $V_{19}$ are applied to an end of a stigmator 25 by the control unit 1. The control unit 1 applies a signal $S_{19}$ to the spin-polarized electron source 40 to determine a direction of polarization of the spin-polarized electrons 3 and applies signals $S_2$ through $S_{17}$ to the coarse and fine microdeflectors 14 and 15, respectively, to deflect the spin-polarized electron beam 19. In addition, the control unit 1 applies a signal $S1$ to the blanking element 13 and reads data by alternately detecting signals $S_{18}$ and $S_{20}$.

According to the data storage device and method disclosed in the U.S. Pat. No. 6,304,481 patent, it is necessary but not at all easy to minutely control voltage in order to concentrate the electron beam on a specific data storage region. In addition, in order to inject the electron beam onto the data storage medium, there must be a non-conductive space provided on the data storage medium, which results in lower efficiency and makes it harder to precisely output detection signals used to reproduce data from the data storage medium.

SUMMARY OF THE INVENTION

The present invention provides a high-density magnetic recording medium using spin-dependent scattering of electrons and an apparatus and a method for reading data from the magnetic recording medium using a probe injecting electrons into the magnetic recording medium.

According to an aspect of the present invention, there is provided a magnetic recording medium. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer.

Preferably, the first and second magnetic layers have in-plane or perpendicular magnetic anisotropy.

Preferably, the first and second magnetic layers are continuous film layers.

Preferably, the first and second magnetic layers are partially or entirely patterned.

Preferably, bits of the first and second magnetic layers are comprised of nano-particles.

Preferably, the first and second magnetic layers are each comprised of magnetic multi-layers.

Preferably, the non-magnetic layer is a metal layer.

Preferably, the magnetic recording medium further includes an oxide layer, through which electrons tunnel, over the magnetic layer.

Preferably, the non-magnetic layer is an oxide layer.

Preferably, the magnetic recording medium further includes a non-magnetic metal layer below the first magnetic layer.

Preferably, the magnetic recording medium further includes a non-magnetic metal layer on the second magnetic layer.

According to another aspect of the present invention, there is provided an apparatus for reading data. The apparatus includes a probe, a magnetic recording medium, a control unit, and a measurement unit. The probe emits hot electrons using a Schottky junction comprised of a semiconductor tip capped with a non-magnetic metal layer. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer. The control unit applies voltage to the probe so that the probe can emit hot electrons. The measurement unit reads data recorded on the magnetic recording medium by detecting output current at the substrate that varies according to the parallel or anti-parallel alignment of magnetizations of the first and second magnetic layers.

According to another aspect of the present invention, there is provided an apparatus for reading data. The apparatus includes a probe, a magnetic recording medium, a control unit, and a measurement unit. The probe includes a semiconductor tip and emits hot electrons. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer. The control unit applies voltage to the probe so that the tip can emit hot electrons. The measurement unit reads data recorded on the magnetic recording medium by detecting output current at the substrate that varies according to the parallel or anti-parallel alignment of magnetizations of the first and second magnetic layers.

Preferably, the apparatus further includes a non-magnetic metal layer below the first magnetic layer.

Preferably, the apparatus further includes a non-magnetic metal layer over the second magnetic layer.

Preferably, the first and second magnetic layers have in-plane or perpendicular magnetic anisotropy.

Preferably, the first and second magnetic layers are continuous film layers.

Preferably, the first and second magnetic layers are partially or entirely patterned.

Preferably, bits of the first and second magnetic layers are comprised of nano-particles.

Preferably, the first and second magnetic layers are each comprised of magnetic multi-layers.

Preferably, the non-magnetic layer is a metal layer.

According to another aspect of the present invention, there is provided an apparatus for reading data. The apparatus includes a probe, a magnetic recording medium, a control unit, and a measurement unit. The probe includes a semiconductor tip capped with an oxide layer that converts electrons passing through it into hot electrons. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer. The control unit applies voltage to the probe so that the probe can emit hot electrons. The measurement unit reads data recorded on the magnetic recording medium by detecting output current at the substrate that varies according to the parallel or anti-parallel alignment of magnetizations of the first and second magnetic layers.

Preferably, the apparatus further includes a non-magnetic metal layer below the first magnetic layer.

Preferably, the apparatus further includes a non-magnetic metal layer over the second magnetic layer.

Preferably, the first and second magnetic layers have in-plane or perpendicular magnetic anisotropy.

Preferably, the first and second magnetic layers are continuous film layers.

Preferably, the first and second magnetic layers are partially or entirely patterned.

Preferably, bits of the first and second magnetic layers are comprised of nano-particles.

Preferably, the first and second magnetic layers are each comprised of magnetic multi-layers.

Preferably, the non-magnetic layer is a metal layer.

According to another aspect of the present invention, there is provided an apparatus for reading data. The apparatus includes a probe, a magnetic recording medium, a control unit, and a measurement unit. The probe includes a conductive tip from which electrons are emitted. The magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer, and an oxide layer placed over the second magnetic layer that converts electrons passing through it into hot electrons. The control unit applies voltage to the probe so that the tip can emit electrons. The measurement unit reads data recorded on the magnetic recording medium by detecting output current at the substrate that varies according to the parallel or anti-parallel alignment of magnetizations of the first and second magnetic layers.

Preferably, the apparatus further includes a non-magnetic metal layer below the first magnetic layer.

Preferably, the apparatus further includes a non-magnetic metal layer over the second magnetic layer.

Preferably, the first and second magnetic layers have in-plane or perpendicular magnetic anisotropy.

Preferably, the first and second magnetic layers are continuous film layers.

Preferably, the first and second magnetic layers are partially or entirely patterned.

Preferably, bits of the first and second magnetic layers are comprised of nano-particles.

Preferably, the first and second magnetic layers are each comprised of magnetic multi-layers.

According to another aspect of the present invention, there is provided an apparatus for reading data including a probe, a magnetic recording medium, a control unit, and a measurement unit. The probe includes a conductive tip from which electrons are emitted. The magnetic recording medium includes a substrate, a first magnetic layer placed over the substrate, an oxide layer placed over the first magnetic layer that converts electrons passing through it into hot electrons, and a second magnetic layer placed over the oxide layer and having a magnetization direction parallel or anti-parallel with a magnetization direction of the first magnetic layer. The control unit applies voltage to the probe so that the tip can emit electrons. The measurement unit reads data recorded on the magnetic recording medium by detecting output current at the substrate that varies according to the parallel or anti-parallel alignment of magnetizations of the first and second magnetic layers.

Preferably, the apparatus further includes a non-magnetic metal layer below the first magnetic layer.

Preferably, the apparatus further includes a non-magnetic metal layer over the second magnetic layer.

Preferably, the first and second magnetic layers have in-plane or perpendicular magnetic anisotropy.

Preferably, the first and second magnetic layers are continuous film layers.

Preferably, the first and second magnetic layers are partially or entirely patterned.

Preferably, bits of the first and second magnetic layers are comprised of nano-particles.

Preferably, the first and second magnetic layers are each comprised of magnetic multi-layers.

According to another aspect of the present invention, there is provided a method of reading data. The method includes injecting hot electrons into a magnetic recording medium using a probe, detecting output current at the substrate determined by scattering of hot electrons dependent on the parallel or anti-parallel state of magnetizations of the first and second magnetic layers, and reading data recorded on the magnetic recording medium by recognizing the value of a data bit as a first binary value when the current exceeds a predetermined reference value and recognizing the value of the data bit as a second binary value when the current does not exceed the predetermined reference value.

Preferably, the magnetic recording medium includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer.

Preferably, the magnetic recording medium further comprises a non-magnetic metal layer below the first magnetic layer.

Preferably, the magnetic recording medium further comprises a non-magnetic metal layer over the second magnetic layer.

Preferably, the probe includes a semiconductor tip which is capped with a non-magnetic metal layer so that a Schottky junction can be formed.

Preferably, the probe includes a semiconductor tip capped with an oxide layer which converts electrons passing through it into hot electrons.

Preferably, the probe includes a semiconductor tip that emits hot electrons.

Preferably, the magnetic recording medium further comprises an oxide layer over the second magnetic layer, and the oxide layer converts electrons passing through it into hot electrons.

Preferably, the probe includes a conductive tip.

Preferably, the non-magnetic layer is an oxide layer that converts electrons passing through it into hot electrons.

Preferably, the probe includes a conductive tip.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which preferred embodiments of the present invention are shown.

Figure 1:
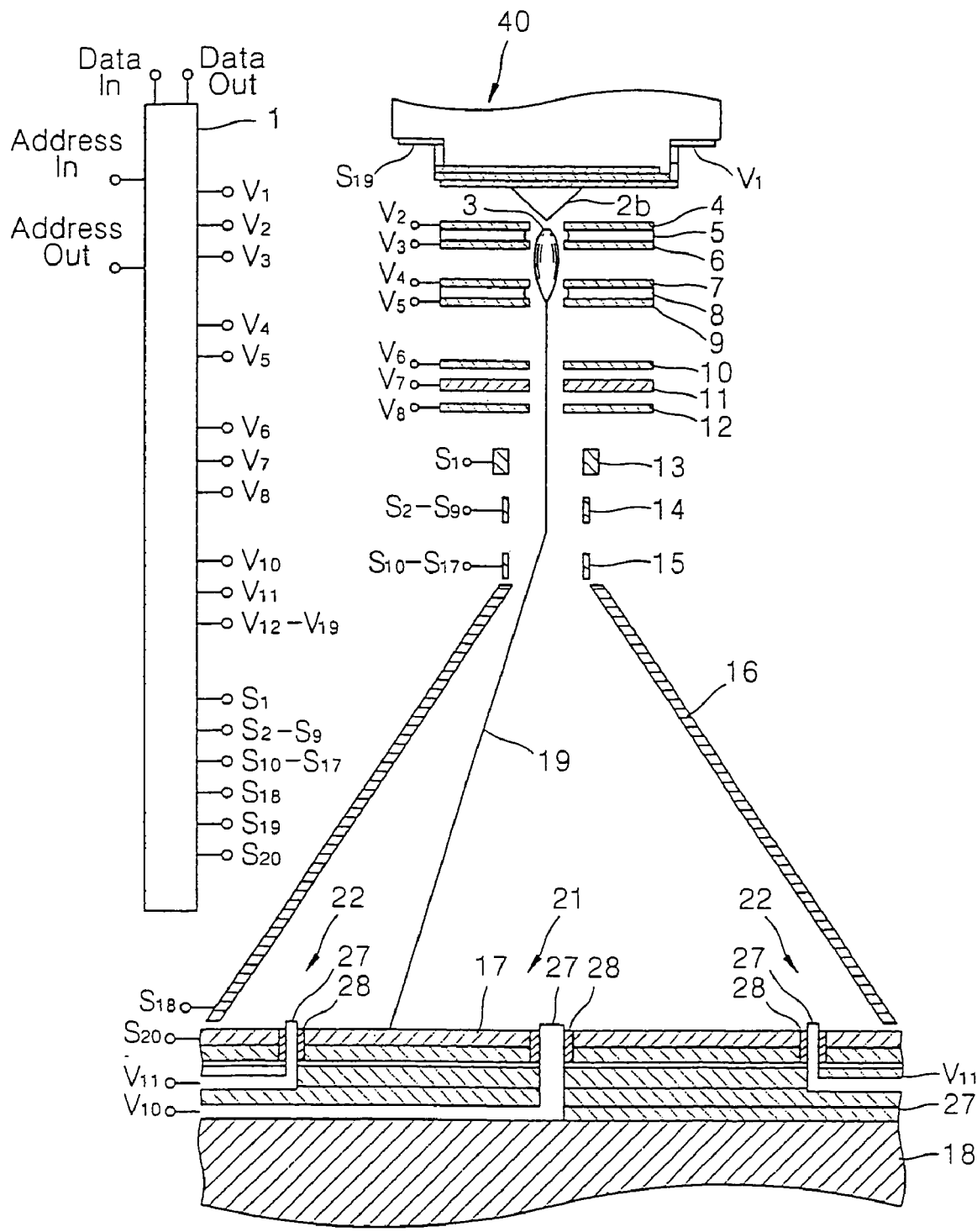
FIG. 1 is a cross-sectional view of a data storage device disclosed in U.S. Pat. No. 6,304,481.
Figure 2:
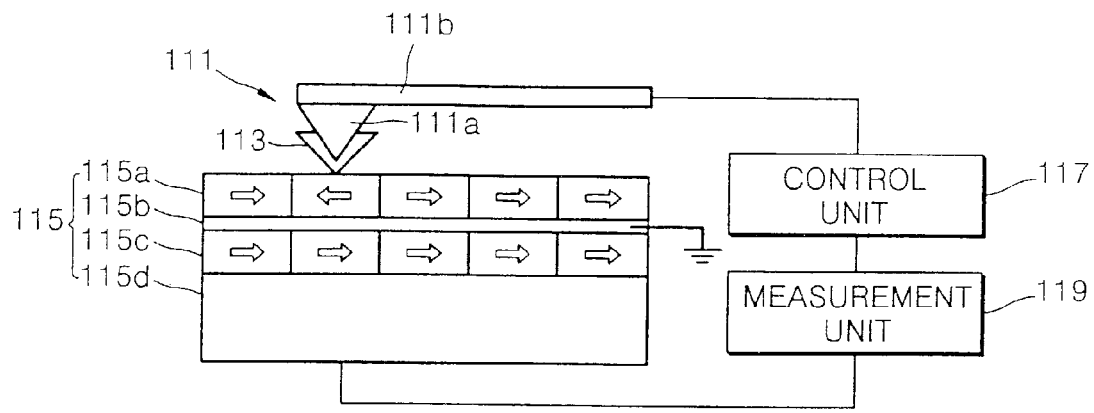
FIG. 2 is a schematic view illustrating a magnetic recording medium and an apparatus for reading data from the magnetic recording medium according to a first embodiment of the present invention.

FIG. 2 is a schematic diagram illustrating a magnetic recording medium and an apparatus for reading data from the magnetic recording medium according to a first embodiment of the present invention. Referring to FIG. 2, a magnetic recording medium 115 according to a first embodiment of the present invention includes a substrate 115d, a first magnetic layer 115c placed over the top surface of the substrate 115d and comprised of continuous bits having in-plane magnetic anisotropy, a non-magnetic metal layer 115b placed over the top surface of the first magnetic layer 115c, and a second magnetic layer 115a deposited on the top surface of the non-magnetic metal layer 115b and comprised of continuous bits having in-plane magnetic anisotropy. Here, the magnetization direction of the second magnetic layer 115a is parallel or anti-parallel with the magnetization direction of the first magnetic layer 115c, and the non-magnetic metal layer 115b is grounded. All or part of the first and second magnetic layers 115c and 115a may be patterned. The substrate 115d is a semiconductor substrate.

Referring to FIG. 2, an apparatus for reading data from the magnetic recording medium 115 according to a first embodiment of the present invention includes a probe 111, which is comprised of a semiconductor tip 111a capped with a non-magnetic metal layer 113 with a Schottky junction formed therebetween, a control unit 117 that applies an appropriate voltage to the probe 111 to make the probe 111 emit hot electrons, and a measurement unit 119 that reads data recorded on the magnetic recording medium 115 by detecting current generated by the flow of the hot electrons injected into the magnetic recording medium 115. In FIG. 2, reference numeral 111b represents a cantilever with the tip 111a located at its end. The cantilever 111b is used to move the probe 111 in response to a signal output from the control unit 117.

If the probe 111 is connected to the cathode, electrons emitted from the cathode are injected into the tip 111a of the probe 111. Due to the Schottky junction formed between the tip 111a and the non-magnetic metal layer 113 covering the tip 111a, an energy barrier, i.e., a Schottky barrier, is formed at the interface between the tip 111a and the non-magnetic metal layer 113. Since electrons emitted from the tip 111a are required to pass through the Schottky barrier, they are generated as nonequilibrium hot electrons having an energy higher than the Fermi level by about 1 eV. The hot electrons emitted from the probe 111 are injected into the magnetic recording medium 115. Passing through the magnetic recording medium 115, the hot electrons scatter depending on the magnetization directions of the first and second magnetic layers 115c and 115a.

Passing through the first and second magnetic layers 115c and 115a, the hot electrons go through elastic or inelastic scattering, which causes the momentum and energy of the hot electrons to change. If the spin direction of the hot electrons is the same as the magnetization direction of the magnetic recording medium 115, the hot electros are expected to scatter less. On the other hand, if the spin direction of the hot electrons is not the same as the magnetization direction of the magnetic recording medium 115, the hot electrons are expected to scatter more and lose a considerable amount of their energy. Hot electrons that lose a lot of energy from scattering cannot jump over an energy barrier formed at the interface between the first magnetic layer 115a and the semiconductor substrate 115d, while hot electrons undergoing only mild scattering can easily jump over the energy barrier. Accordingly, the current may vary depending on the degree to which the hot electrons scatter.

If the magnetization direction of predetermined bits of the first magnetic layer 115c is parallel with the magnetization direction of predetermined bits of the second magnetic layer 115a, hot electrons having one spin direction can pass through both the first and second magnetic layers 115c and 115a so that a large current is measured by the measurement unit 119. On the other hand, if the magnetization direction of predetermined bits of the first magnetic layer 115c is anti-parallel with the magnetization direction of predetermined bits of the second magnetic layer 115a, hot electrons are expected to scatter a lot passing through a magnetic layer having a magnetization direction opposite to their spin direction so that the current measured by the measurement unit 119 decreases. If the current measured by the measurement unit 119 is greater than a predetermined reference value, a binary value of "1" is recognized, and if it is not, a binary value of "0" is recognized (or vice versa). In this way, it is possible to read data recorded on the magnetic recording medium 115. Here, it is possible to read data from the magnetic recording medium 115 even when the direction of current in the magnetic recording medium 115 is reversed.

Figure 3:
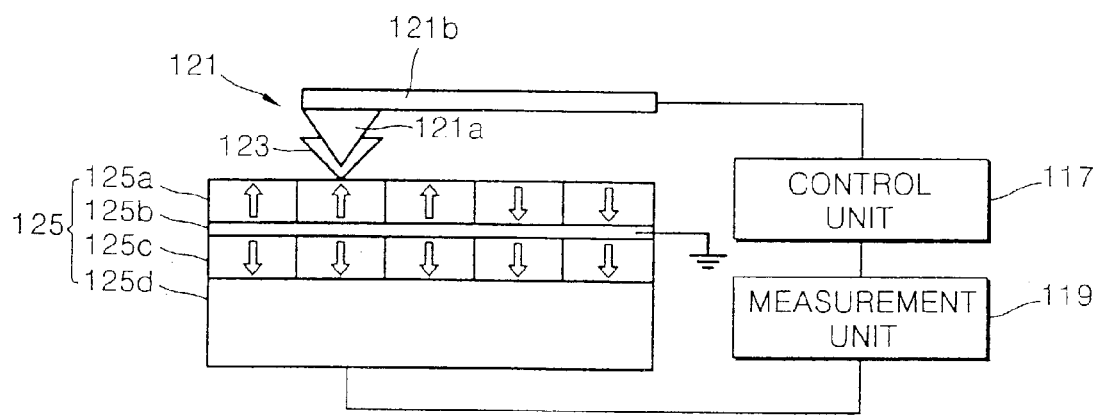
FIG. 3 is a schematic diagram illustrating a magnetic recording medium and an apparatus for reading data from the magnetic recording medium according to a second embodiment of the present invention.

FIG. 3 is a schematic view illustrating a magnetic recording medium and an apparatus for reading data from the magnetic recording medium according to a second embodiment of the present invention. Referring to FIG. 3, a magnetic recording medium 125 according to a second embodiment of the present invention includes a substrate 125d, and a first magnetic layer 125c, a non-magnetic metal layer 125b, and a second magnetic layer 125a sequentially deposited on the substrate 125d. The first and second magnetic layers 125c and 125a are continuous film layers having perpendicular magnetic anisotropy. Here, all or part of the first and second magnetic layers 125c and 125a may be patterned.

Referring to FIG. 3, an apparatus for reading data from the magnetic recording medium 125 according to a second embodiment of the present invention, like the one shown in FIG. 2, includes a probe 121, a control unit 117 that applies voltage to the probe 121 so as to output a signal used for moving a cantilever 121b, and a measurement unit 119 that detects the current varying in accordance with the degree of scattering of hot electrons passing through the magnetic recording medium 125 and reading data recorded on the magnetic recording medium 125 based on the detected current. The probe 121, unlike the probe 111 shown in FIG. 2, generates hot electrons by passing electrons through an oxide layer 123 thinly capping a tip 121a, instead of a Schottky junction.

A method of reading data from the magnetic recording medium 125 according to a second embodiment of the present invention is as follows. In the present embodiment, like in the first embodiment shown in FIG. 2, data recorded on the magnetic recording medium 125 can be read by detecting the current of hot electrons, which varies depending on whether the magnetization of the first magnetic layer 125c is parallel or anti-parallel with the magnetization direction of the second magnetic layer 125a. In other words, hot electrons in a specific spin state scatter only a little when the magnetization direction of the first magnetic layer 125c is parallel with that of the second magnetic layer 125a while they scatter a lot when the magnetization direction of the first magnetic layer 125c is anti-parallel with that of the second magnetic layer 125a. The current may vary depending on the degree of scattering of the hot electrons. Recorded bits of data are recognized as "1" or "0" based upon the current measured by the measurement unit 119. In this way, the data recorded on the magnetic recording medium 125 can be reproduced. Here, it is possible to reproduce data from the magnetic recording medium 125 even when the direction of current in the magnetic recording medium 125 is reversed.

Figure 4:
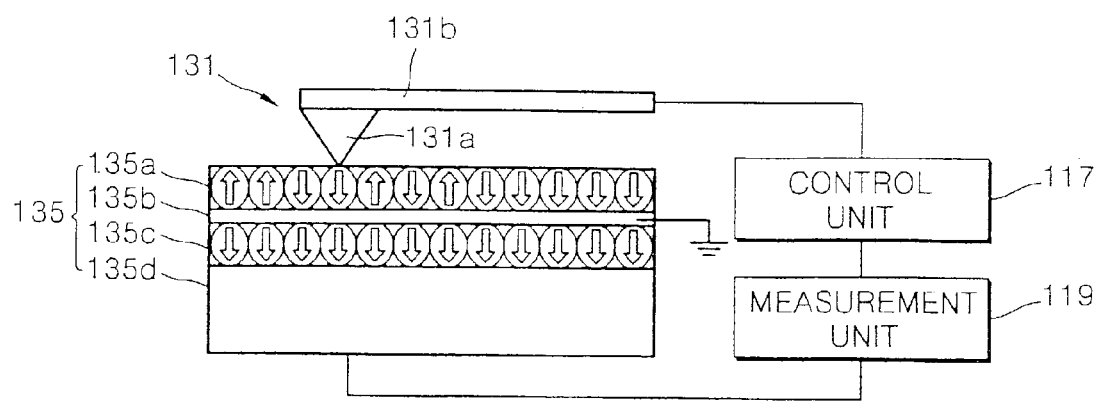
FIG. 4 is a schematic diagram illustrating a magnetic recording medium and an apparatus for reading data from the magnetic recording medium according to a third embodiment of the present invention.

FIG. 4 is a schematic view illustrating a magnetic recording medium and an apparatus for reading data from the magnetic recording medium according to a third embodiment of the present invention. Referring to FIG. 4, a magnetic recording medium 135 according to a third embodiment of the present invention includes a substrate 135d, and a first magnetic layer 135c, a non-magnetic metal layer 135b, and a second magnetic layer 135a sequentially deposited on the substrate 135d. In the present embodiment, unlike in the first and second embodiments of the present invention, bits constituting the first and second magnetic layers 135c and 135a are comprised of nano-particles instead of a continuous film layer and have perpendicular magnetic anisotropy. The first and second magnetic layers 135c and 135a comprised of nano-particles may be formed using a vacuum deposition method or a chemical method. In particular, the first and second magnetic layers 135c and 135a may be formed using a chemical method which involves reducing $Pt(acac)_2$ (acac=acetylacetonate, $CH_3COCHCOCH_3$) to diol, forming nano-particles by dissolving $Fe(CO)_5$ at a high temperature, and forming a FePt magnetic layer using thermal annealing.

A non-magnetic metal layer may be additionally formed under the first magnetic layers 115c, 125c, and 135c or on top of the second magnetic layers 115a, 125a, and 135a. In addition, in the magnetic recording mediums 115, 125, and 135 according to the first through third embodiments of the present invention, each of the first magnetic layers 115c, 125c, and 135c or each of the second magnetic layers 115a, 125a, and 135a may be formed of magnetic multi-layers.

An apparatus for reading data from the magnetic recording medium 135 according to a third embodiment of the present invention includes a probe 131 having a cantilever 131b with a semiconductor tip 131a placed at its end. A control unit 117 and a measurement unit 119 are the same as their counterparts in the first and second embodiments of the present invention, and thus their description will not be repeated here. Here, it is possible to reproduce data from the magnetic recording medium 135 even when the direction of current in the magnetic recording medium 135 is reversed.

When the control unit 117 applies a predetermined voltage to the probe 131, hot electrons having an energy higher than the Fermi level are emitted from the tip 131a. The degree to which the hot electrons scatter varies depending on whether the magnetization direction of bits of the first magnetic layer 135c is parallel or anti-parallel with the magnetization direction of bits of the second magnetic layer 135a. A method of reading data from the magnetic recording medium 135 according to a third embodiment of the present invention is the same as in the first and second embodiments of the present invention.

Figure 5:
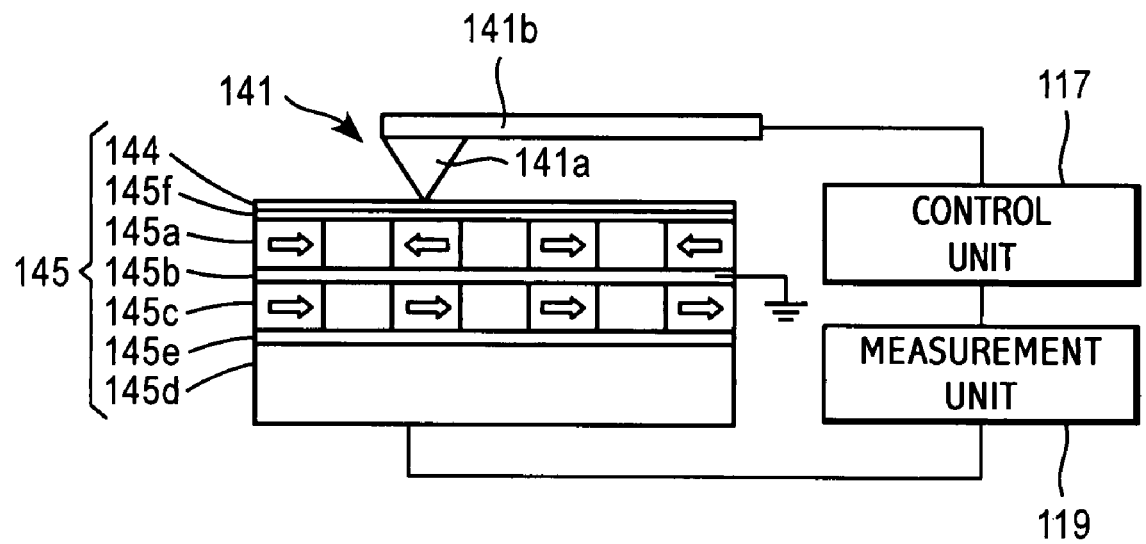
FIG. 5 is a schematic diagram illustrating a magnetic recording medium and an apparatus for reading data from the magnetic recording medium according to a fourth embodiment of the present invention.

FIG. 5 is a schematic view illustrating a magnetic recording medium and an apparatus for reading data from the magnetic recording medium according to a fourth embodiment of the present invention. Referring to FIG. 5, a magnetic recording medium 145 according to a fourth embodiment of the present invention includes a substrate 145d, and a first magnetic layer 145c, a non-magnetic layer 145b, a second magnetic layer 145a, and an oxide layer 144, which are sequentially deposited on the substrate 145d. The non-magnetic layer 145b can be a metal layer or an oxide layer. Optionally, a non-magnetic metal layer 145e can be provided below the first magnetic layer 145c and/or a non-magnetic metal layer 145f can be provided on the second magnetic layer 145a. The first and second magnetic layers 145c and 145a have in-plane magnetic anisotropy and are partially patterned. Electrons passing through the oxide layer 144 are converted into hot electrons.

An apparatus for reading data from the magnetic recording medium 145 according to a fourth embodiment of the present invention includes a probe 141 comprised of a conductive tip 141a and a cantilever 141b. Passing through the oxide layer 144, electrons emitted from the conductive tip 141a are converted into hot electrons having increased energy. A control unit 117 and a measurement unit 119 have the same functions as their counterparts in the first and second embodiments of the present invention, and a method of reading data from the magnetic recording medium 145 according to a fourth embodiment of the present invention is the same as in the first and second embodiments of the present invention.

Figure 6:
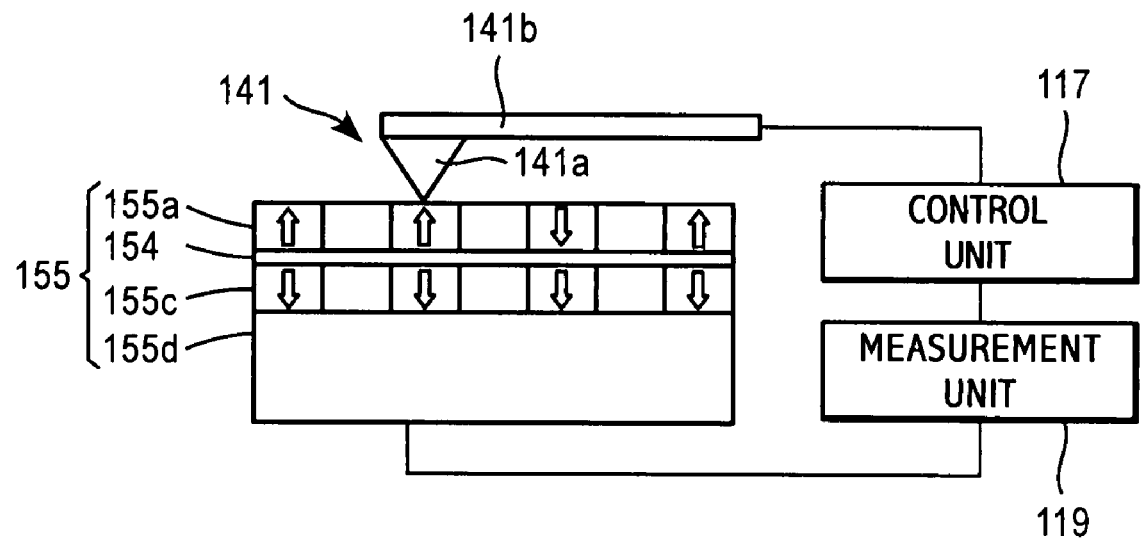
FIG. 6 is a schematic diagram illustrating a magnetic recording medium and an apparatus for reading data from the magnetic recording medium according to a fifth embodiment of the present invention.

FIG. 6 is a schematic view illustrating a magnetic recording medium and an apparatus for reading data from the magnetic recording medium according to a fifth embodiment of the present invention. Referring to FIG. 6, a magnetic recording medium 155 according to a fifth embodiment of the present invention includes a substrate 155d, a first magnetic layer 155c deposited on the substrate 155d, an oxide layer 154 deposited on the first magnetic layer 155c, and a second magnetic layer 155a deposited on the oxide layer 154. The first and second magnetic layers 155c and 155a have perpendicular magnetic anisotropy and are partially patterned.

An apparatus for reading data from the magnetic recording medium 155 according to a fifth embodiment of the present invention is the same as the one according to the fourth embodiment of the present invention. And, a method of reading data from the magnetic recording medium 155 according to a fifth embodiment of the present invention is the same as the one according to the fourth embodiment of the present invention. In other words, in the fifth embodiment of the present invention, as well, electrons are converted into hot electrons having increased energy, passing through the oxide layer 154. A control unit 117 and a measurement unit 119 are the same as their counterparts in the first and second embodiments of the present invention, and a method of reading data from the magnetic recording medium 155 according to a fifth embodiment of the present invention is the same as the ones according to the first and second embodiments of the present invention.

According to the first through fourth embodiments of the present invention, a first magnetic layer and a second magnetic layer may be formed of magnetic multi-layers, and it is possible to read data recorded on a magnetic recording medium by recognizing the value of a bit as 1 (or 0) when the measured current exceeds a predetermined reference value and as 0 (or 1) when the measured current does not exceed the predetermined reference value.

The magnetic recording medium according to the present invention may be manufactured to have a large storage capacity by forming magnetic layers so that the magnetization direction of one magnetic layer is parallel or anti-parallel with that of another magnetic layer. The resolution of an apparatus for reading data from a magnetic recording medium using a probe is determined by the size of the probe. The apparatus and the method for reading data from a magnetic recording medium according to the present invention measure variations in current caused by spin-dependent scattering of hot electrons injected into the magnetic recording medium. Accordingly, it is possible to read bit information having a size of several nanometers by manufacturing a probe to have such size. In addition, it is easy to manufacture such a probe because the probe is only required to have a function of injecting electrons into the magnetic recording medium. Moreover, according to the present invention, it is possible to reproduce data from the magnetic recording medium at high speed by detecting current, and it is easy to construct a system with peripheral circuits.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for reading data, comprising:
a probe which emits hot electrons using a Schottky junction comprised of a semiconductor tip capped with a non-magnetic metal layer;
a magnetic recording medium which includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer;
a control unit which applies voltage to the probe so that the probe can emit hot electrons; and
a measurement unit which reads data recorded on the magnetic recording medium by detecting output current at the substrate that varies according to the parallel or anti-parallel alignment of magnetizations of the first and second magnetic layers.

2. The apparatus of claim 1 further comprising a non-magnetic metal layer below the first magnetic layer.

3. The apparatus of claim 1 further comprising a non-magnetic metal layer over the second magnetic layer.

4. The apparatus of claim 1, wherein the first and second magnetic layers have in-plane or perpendicular magnetic anisotropy.

5. The apparatus of claim 1, wherein the first and second magnetic layers are continuous film layers.

6. The apparatus of claim 1, wherein the first and second magnetic layers are partially or entirely patterned.

7. The apparatus of claim 1, wherein bits of the first and second magnetic layers are comprised of nano-particles.

8. The apparatus of claim 1, wherein the first and second magnetic layers are each comprised of magnetic multi-layers.

9. The apparatus of claim 1, wherein the non-magnetic layer is a metal layer.

10. An apparatus for reading data, comprising:

a probe which includes a semiconductor tip capped with an oxide layer that converts electrons passing through it into hot electrons;

a magnetic recording medium which includes a substrate, a first magnetic layer placed over the substrate, a non-magnetic layer placed over the first magnetic layer, and a second magnetic layer placed over the non-magnetic layer and having a magnetization direction parallel or anti-parallel with a magnetization direction of the first magnetic layer;

a control unit which applies voltage to the probe so that the probe can emit hot electrons; and a measurement unit which reads data recorded on the magnetic recording medium by detecting output current at the substrate that varies according to the parallel or anti-parallel alignment of magnetizations of the first and second magnetic layers.

11. The apparatus of claim 10 further comprising a non-magnetic metal layer below the first magnetic layer.

12. The apparatus of claim 10 further comprising a non-magnetic metal layer over the second magnetic layer.

13. The apparatus of claim 10, wherein the first and second magnetic layers have in-plane or perpendicular magnetic anisotropy.

14. The apparatus of claim 10, wherein the first and second magnetic layers are continuous film layers.

15. The apparatus of claim 10, wherein the first and second magnetic layers are partially or entirely patterned.

16. The apparatus of claim 10, wherein bits of the first and second magnetic layers are comprised of nano-particles.

17. The apparatus of claim 10, wherein the first and second magnetic layers are each comprised of magnetic multi-layers.

18. The apparatus of claim 10, wherein the non-magnetic layer is a metal layer.

* * * * *